United States Patent [11] 3,580,112

[72] Inventor Hansjorg Dach
 Friedrichshafen, Germany
[21] Appl. No. 817,984
[22] Filed Apr. 21, 1969
[45] Patented May 25, 1971
[73] Assignee Zahnradfabrik Friedrichshafen
 Aktiengesellschaft
 Friedrichshafen, Germany
[32] Priority Apr. 20, 1968
[33] Germany
[31] P 17 55 282.8

[54] AUTOMATIC GEAR-SHIFT CONTROL FOR AUTOMOTIVE TRANSMISSION SYSTEM
 9 Claims, 6 Drawing Figs.
[52] U.S. Cl. .................................................... 74/868
[51] Int. Cl. .............................................. B60k 21/08
[50] Field of Search ................................. 74/867, 868

[56] References Cited
 UNITED STATES PATENTS
 2,873,618 2/1959 De Loream ................ 74/868X
 3,053,107 9/1962 Winchell ...................... 74/868
 3,180,173 4/1965 Fisher et al. ................. 74/868

*Primary Examiner*—Arthur T. McKeon
*Attorney*—Karl F. Ross

ABSTRACT: A throttle valve 40 connected to a supply of hydraulic fluid delivers a variable fluid pressure dependent on the engine load of an automotive vehicle whose accelerator controls a plunger 42 which, through the intermediary of a compression spring 43, resists the displacement of the body 41 of that valve in response to the supply pressure. In a retracted or partly depressed position of the accelerator, the plunger 42 blocks the transmission of the load-dependent fluid pressure via a first conduit 220 to an automatic switching device 90 having a control piston 91 acted upon by speed-dependent fluid pressure and biased by a countervailing spring 105 into a normal, low-speed position. In the absence of supplemental fluid pressure from the throttle valve 40, the control piston 91 together with an associated slider 98 is moved into an off-normal, high-speed position whenever the speed-dependent fluid pressure overcomes the force of the biasing spring 105; with the accelerator in a position approaching full throttle, i.e. beyond a predetermined load threshold, the biasing force is supplemented by the load-dependent fluid pressure so that upshifting occurs at higher drive shaft speeds only. The load-dependent fluid pressure is applied in aiding relationship via two branch conduits 220a, 220d to a face of the piston and to another face on the slider, the first branch conduit 220a being obstructed in the off-normal piston position so as to create a hysteresis effect whereby under unchanged load conditions the downshift takes place at a lower speed than the upshift. Another conduit 221, unblocked by the plunger 42 in a kickdown position of the accelerator, partly cancels the aforementioned hysteresis effect whereby downshift under maximum load occurs at a higher speed.

INVENTOR:
Hansjörg Dach

ATTORNEY:
Karl J. Ross

AUTOMATIC GEAR-SHIFT CONTROL FOR AUTOMOTIVE TRANSMISSION SYSTEM

My present invention relates to a transmission system for automotive vehicles in which a change in speed ratio, commonly known as gear shift, is effected automatically under certain load and speed conditions.

Automotive transmission systems of this type generally have an input shaft and an output shaft interconnected by a set of gears, usually including a planetary gear train, which can be selectively adjusted to provide different speed ratios between the two shafts. With a given engine load as determined by the position of an accelerator (gas pedal) controlling the fuel supply to an internal-combustion engine driving the input shaft, the switchover from a lower speed ratio to a higher one occurs whenever the output shaft (drive shaft) and therefore the traction wheels of the vehicle surpass a certain speed level. This switchover, or upshifting, takes place therefore at different speeds, depending upon the position of the accelerator, as does the change to a lower speed ratio or downshifting in response to increasing load and/or decreasing drive shaft speed.

From the viewpoint of fuel economy it is advantageous that the vehicle be always driven at the highest speed ratio at which a desired velocity can be maintained. Thus, it is undesirable to shift back to a lower gear during a temporary loss of speed, as when the vehicle clears a small rise in the road, and it is equally inconvenient to have the transmission shift back and forth with minor changes in the accelerator position which may occur with the vehicle moving under conditions of low-to-moderate loading, e.g., when gradually accelerating from city traffic to highway driving.

It is, therefore, the general object of my present invention to provide means in such a transmission system for establishing a speed range within which gear shifting (up or down) will invariably occur under normal driving conditions, the limits of this range being relatively low to reduce fuel consumption, with a delay in upshifting occurring only in extraordinary situations (e.g., during the overtaking of another vehicle) when more power is needed for rapid acceleration or sustained uphill driving.

A related object is to provide means in such a system for introducing an increased hysteresis effect to retard a downshift under high-load conditions in order to prevent unnecessary changeover to a lower speed ratio in response to a slowdown to a level well above the normal gear-shifting range.

These objects are realized, pursuant to my present invention, by a transmission system in which the switchover between two speed ratios (e.g., between "second gear" and "third gear") is controlled by a spring-loaded valve piston having a first face subjected to a speed-dependent first fluid pressure which tends to displace the piston as soon as the fluid pressure reaches a predetermined level sufficient to overcome a predetermined biasing force acting in the opposite direction, i.e., in a sense tending to maintain the piston in a normal, low-speed position. The displacement of the piston into its off-normal, high-speed position is also opposed by a second fluid pressure, acting upon a second piston face, which has a substantially constant value (preferably zero) whenever the accelerator is fully retracted (position of minimum load or idling) or partly advanced up to an intermediate position corresponding to a predetermined load threshold; when that threshold is exceeded, the second fluid pressure rises progressively with increasing load up to a position of maximum load, hereinafter referred to as full throttle. If the accelerator is provided with a kick-down position beyond full throttle, i.e., a position designed to supply extra power without significant increase in the fuel supply, the rise in second fluid pressure continues in the kick-down range in which, as is well known per se, the driver may experience an increased reaction force to apprise him of the fact that he is expending additional fuel.

In order to provide a desired hysteresis or toggle effect which under unchanged load conditions lets a downshift occur at a substantially lower speed than the upshift, I provide —pursuant to another feature of my invention —a split conduit with one branch terminating at the aforementioned second piston face and with another branch terminating at a third-position face, turned to the same side as the former, the first-mentioned branch being obstructed as soon as the piston shifts to its off-normal position. This hysteresis effect may supplement a similar effect created by two confronting piston faces of different surface areas, which are subject to fluid pressure in the off-normal piston position, the latter effect thus being also present when the load-dependent fluid pressure is cut off in the operating range below the load threshold described above. Such cutoff may be effected, in accordance with a further feature of my invention, by a plunger which acts through a compression spring upon a valve member of a throttle valve and, moving under the control of the accelerator, blocks the output of that throttle valve until the accelerator has reached its aforementioned intermediate position. In the kick-down position, another conduit unblocked by the plunger applies fluid pressure to the piston in a sense reducing the hysteresis effect due to the obstruction of one of the branches of the first conduit.

Certain of the aforementioned piston faces may be provided on an extension of the piston designed, for convenience of assembly, as an independent slider controlling the fluid supply to the gear-shifting means (friction clutches and/or brakes) of the planetary gear train, either directly or through a higher order shift-control stage of similar construction.

The above and other features of my invention will be described in greater detail with reference to the accompanying drawing in which:

FIGS. 1, 2 and 3 are somewhat diagrammatic representations of a control system embodying my invention, shown in three different operating positions;

Figures 1, 2:
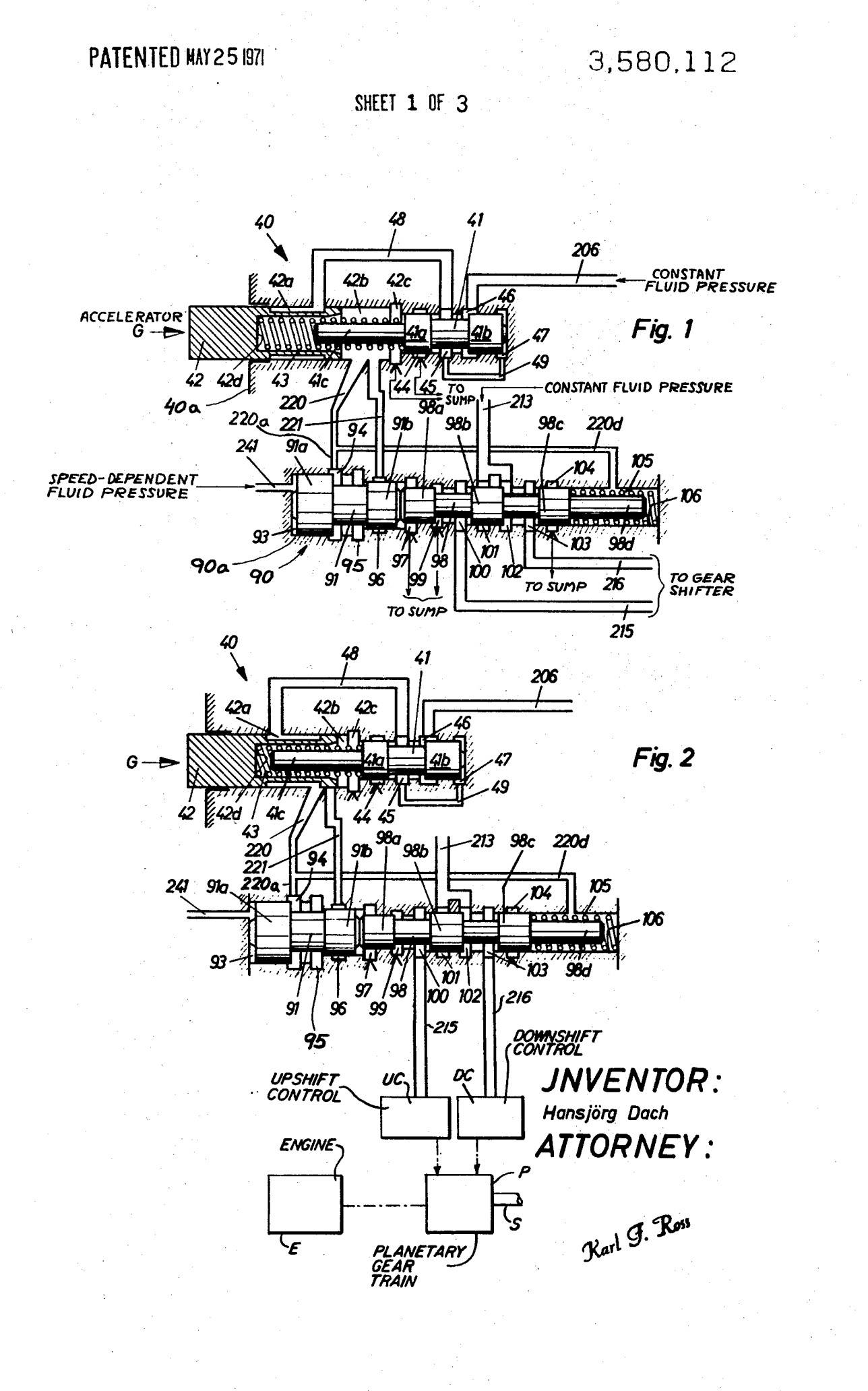
Figure 3:
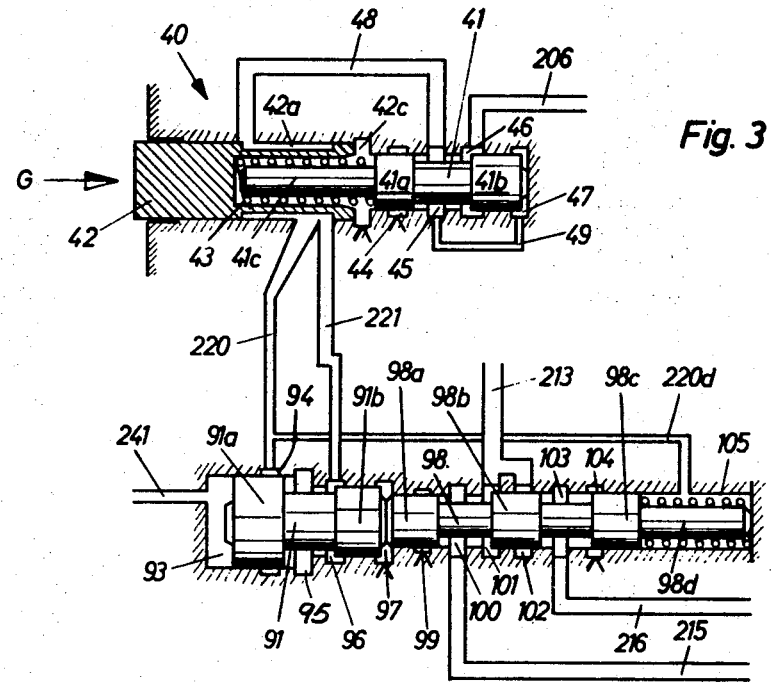

In FIGS. 1—3 I have shown a valve assembly representing one stage of an automatic shift-control system for an automative transmission system which may have several such stages, e.g., a first stage for shifting between "low speed" and "intermediate speed" and a second stage for shifting between "intermediate speed" and "high speed".

The principal components of the system shown in FIGS. 1—3 are a throttle valve 40 and a hydraulic switching device 90. Valve 40 comprises a cylinder 40a accommodating an axially slidable valve member 41, a similarly slidable plunger 42 and a compression spring 43 interposed therebetween, this spring being received in a recess 42d of plunger 42 and embracing a stem 41c of valve member 41. The valve member 41 is a piston with two axially spaced heads 41a, 41b urged by the spring 43 toward its illustrated limiting position adjacent the closed end of the bore 42b of cylinder 40a. Plunger 42, projecting from the open opposite end of the cylinder bore 42b, is mechanically coupled with the accelerator or gas pedal of an automotive vehicle, not further illustrated, as diagrammatically represented by an arrow G. Thus, the position of the accelerator determines that of the plunger 42 and, consequently, the pressure of spring 43 acting upon piston 41.

The reduced right-hand portion of the cylinder bore 42b, receiving the piston 41, is formed with several ring channels 44, 45, 46 and 47. Channel 44 is connected to a sump or the low-pressure side of a fluid-circulation pump, not shown, whose high-pressure side works into a conduit 206 terminating at channel 46. It may be assumed, for purposes of this description, that the pump pressure in conduit 206 is substantially constant, though this is not essential and will generally not be strictly true if the pump is driven by the internal-combustion engine of the vehicle. Channels 45 and 47 are interconnected by an equalizing passage 49. A similar passage 48 extends from channel 45 to the widened left-hand portion of the cylinder bore 42b and opens into that bore at a location confronting an annular peripheral recess 42a of plunger 42. A further ring channel 42c, at the junction of the two different diameter portions of bore 42b, is also connected to the sump.

Two channels 220 and 221 extend from closely adjoining, axially spaced locations of cylinder bore 42b to a cylinder 90a forming part of the switching device 90, the bore of this cylinder accommodating in its left-hand portion 93 a stepped piston 91 with two axially spaced heads 91a, 91b, of different diameters, and in its right-hand portion 106 a slider 98 with three heads 98a, 98b, 98c and a stem 98d as well as a compression spring 105 embracing the stem 98d while bearing upon the closed end of bore portion 106. Slider 98 effectively forms an extension of piston 91 with which it is held in continuous contact by the spring 105. The left-hand piston head 91a is larger than the right-hand piston head 91b which, in turn, exceeds the diameter of the two larger, identically dimensioned slider heads 98b and 98c; the third slider head 98a, immediately adjoining piston head 91b is smaller than the other two slider heads.

The closed end of bore portion 93 is penetrated by a conduit 241 connected to a source of hydraulic fluid whose pressure is generally proportional to the speed of the output shaft S (FIG. 2) of the controlled transmission system powered by an engine E, i.e., the drive shaft of the vehicle, as is well known per se. The pressure of this fluid tends to shift the piston 91 and the slider 98 from their normal left-hand position shown in FIGS. 1 and 2, to an off-normal right-hand position (FIG. 3) against the force of spring 105. Slider 98 acts as a valve member, its head 98b directing fluid from a supply conduit 213 to either of two outgoing conduits 215, 216. Conduit 213 opens into bore portion 106 at two axially spaced ring channels 101, 102. In the normal position of the slider, channel 102 communicates with a similar ring channel 103 connected to conduit 216, whereas in the off-normal position such a connection is established between channel 101 and another ring channel 100 connected to conduit 215. Two further ring channels 99 and 104 of bore portion 106 lead to the sump, channel 104 being normally blocked by head 98c whereas channel 99 is obstructed by head 98a in the position of FIG. 3 only. The left-hand bore portion 93 also is formed with several ring channels, i.e., a channel 94 communicating with a branch 220a of conduit 220 and having a blind extension 95, a channel 96 communicating with conduit 221, and a channel 97 leading to the sump. In the normal piston position shown in FIGS. 1 and 2, inlet 94 is unblocked by head 91a whereas inlet 96 is blocked by head 91b; conduit 220 has another branch 220d terminating in a permanently open outlet at bore portion 106, to the right of slider head 98c. In the alternate position of FIG. 3, inlet 94 is blocked and inlet 96 is open.

If the hydraulic control system shown in FIGS. 1—3 is a lower order stage controlling the shifting between first and second gear, supply conduit 213 may be connected to the high-pressure port of the fluid source (directly or by way of a speed selector controlled by the usual shift lever) whereas discharge conduit 215 connects with a corresponding supply conduit of the next higher stage; the normally operative discharge conduit 216 may then terminate at a hydraulic friction brake or clutch of a planetary-gear system P (FIG. 2) intervening in the establishment of the low-speed power train. If, on the other hand, the illustrated assembly is part of a higher order stage, e.g., (as assumed hereinafter) the stage serving for shifting between second and third gear in a three-speed transmission, supply conduit 213 may be considered connected to the off-normal discharge conduit (such as conduit 215) of the next lower stage whereas its own two discharge conduits 215, 216 terminate at different clutches and/or brakes of the planetary-gear drive these elements having been illustrated diagrammatically at UC (upshift control) and DC (downshift control) in FIG. 2.

With high-pressure fluid arriving over conduit 206, and with the gas pedal retracted so that plunger 42 assumes its extreme left-hand position as illustrated in FIG. 1, spring 43 exerts a relatively low pressure upon valve piston 41 which, in response to the fluid pressure from conduit 206 acting against the right-hand face of head 41a, is displaced toward the left so that head 41b throttles the influx of fluid into the space between the two piston heads while head 41a cracks open the outlet channel 44 until the pressure in that space balances that of the spring. This pressure is also communicated to connecting duct 48 whose outlet end, however, is obstructed at this point by the retracted plunger 42. Line 49 neutralizes or overcompensates the reverse fluid pressure acting upon the left-hand face of head 41b.

Under these circumstances, conduits 220 and 221 are vented to the sump via outlet 42c and the position of piston assembly 91, 98 depends on the magnitude of the fluid pressure at inlet 241 as compared with the countervailing pressure of biasing spring 105. This situation persists for any position of the accelerator-controlled plunger 42 between minimum engine load $L_{min}$(gas pedal retracted) and a load threshold $L_1$(gas pedal partly depressed), see FIG. 4. When the drive shaft speed $n$ is low, the bias of spring 105 prevails and supply conduit 213 remains connected to discharge conduit 216, with resulting torque transmission at low or intermediate speed ratio as determined by the lower order switching stage cascaded with the one shown in the drawing.

Whenever, within the aforedescribed range of throttle positions, the drive shaft speed $n$ reaches a predetermined level $n_1$, the fluid pressure acting upon piston head 91a overrides the pressure of spring 105 so that the device 90 shifts to its alternate position illustrated in FIG. 3. At this point the supply pressure from conduit 213, apart from being transmitted to conduit 215 in lieu of conduit 216 (which is concurrently vented via outlet 104), also acts upon the confronting faces of slider heads 98a and 98b which, in view of the larger effective surface area of head 98b, creates a differential pressure tending to maintain the slider 98 in its right-hand position. This creates a hysteresis effect which maintains the transmission in its upshifted condition until the drive shaft has dropped to another predetermined level $n_1'$, lower than level $n_1$, at which the spring pressure overcomes the combined fluid pressures from inlets 241 and 213 to restore the normal position of FIGS. 1 and 2 wherein conduit 213 again communicates with conduit 216 while conduit 215 is vented to the sump via out 99.

Figure 4:
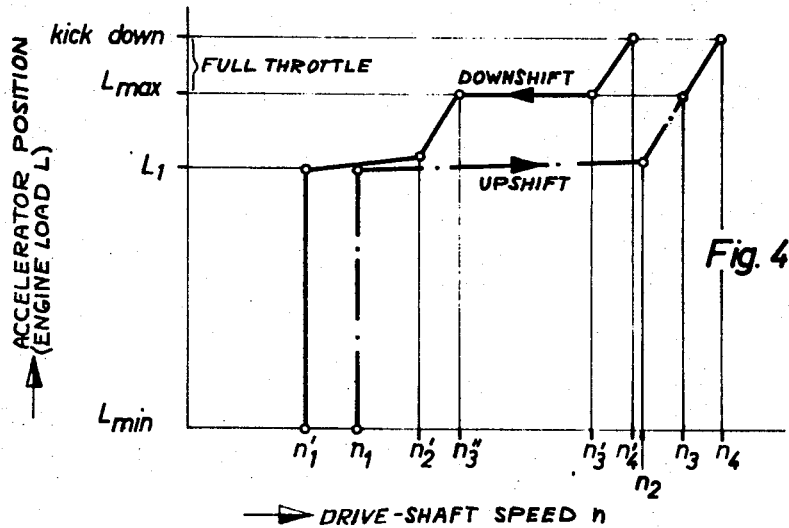
FIG. 4 is a graph serving to explain the operation of the system of FIGS. 1—3.

If, with the device 90 in its normal position, the gas pedal is depressed sufficiently to advance the plunger 42 beyond an intermediate position corresponding to the load threshold $L_1$(see FIG. 4), the fluid pressure prevailing in line 48 is transmitted to conduit 220 and thence to inlet 94 so as to reinforce the pressure of spring 105, thereby raising the switchover speed at which upshifting can occur. The pressure in conduit 220 is determined by the degree of compression of spring 43 and, therefore, varies with the position of the accelerator-controlled plunger 42. As illustrated in FIG. 4, the establishment of full communication between lines 48 and 220 occurs very rapidly, with the plunger 42 moving only slightly beyond threshold position $L_1$ to establish a switchover speed $n_2$ which must be reached before the piston 91 and the slider 98 can be shifted to the off-normal position of FIG. 3.

With progressively greater depression of the gas pedal, up to a "full throttle" position corresponding to maximum load $L_{max}$, the pressure of spring 43 and therefore the fluid pressure in line 48 progressively increase so that the switchover speed rises linearly between points $n_2$ and $n_3$. The shifting of piston 91, however, cuts off the influx of fluid from branch 220a so that, in the position of FIG. 3, only the fluid pressure applied through branch 220d to slider head 98c is effective to supplement the force of spring 105 in opposing the speed-dependent fluid pressure from inlet 241. This creates another hysteresis effect which, added to the one discussed in connection with the confronting faces of heads 98b and 98c, retards the downshift to a speed range represented in FIG. 4 by the straight line $n_2'$—$_3''$ which is still higher than the upper limit $n_1$ of the low-load range but is considerably below the upshift range $n_2$—$n_3$. When the accelerator position again approaches the load threshold $L_1$, the blocking of conduit 220 by plunger 42 shifts the switchover point for the lower speed ratio from level $n_2'$ back to level $n_1'$.

Thus, the dot-dash line $n_1$—$n_2$—$n_3$ of FIG. 4 represents the locus of the switchover points during upshifting whereas the full line $n_3'$—$_3''$—$n_2'$—$n_1'$ represents the locus of the switchover points during downshifting. Both lines are shown extended to a pair of points $n_4$, $n_4'$, respectively, occurring in a fully depressed position of the gas pedal, known as the kick-down position, in which the plunger 42 is advanced sufficiently (see FIG. 3) to unblock not only the conduit 220 but also the conduit 221. Until the switchover occurs from the position of FIG. 2 to that of FIG. 3, conduit 221 is obstructed by piston head 91b so that the only effect of the added depression of the gas pedal is the further increase in the fluid pressure of conduit 220 as indicated by the fact that the line $n_3$—$n_4$ has substantially the same slope as the line $n_2$—$n_3$; the rate of fuel supply to the engine, already at its maximum at throttle position $L_{max}$, is not materially affected by this operation.

As the piston 91 eventually moves toward the right (point $n_4$), its head 91b sufficiently unblocks the channel 96 communicating with conduit 221 to let the fluid pressure in that conduit act differentially upon the two confronting faces of heads 91a, 91b in a sense reinforcing the bias of spring 105, thereby partly canceling the aforedescribed combined hysteresis effect so that the gap between speed ranges $n_3$—$n_4$ (upshifting) and $n_3'$—$n_4'$ (downshifting) is narrowed though remaining still somewhat greater than the gap between speed levels $n_1$ and $n_1'$. The kick-down effect, or return to lower speed ratio at full throttle, occurs therefore at higher drive shaft speeds than in the range $L_1$—$L_{max}$.

Figure 5:
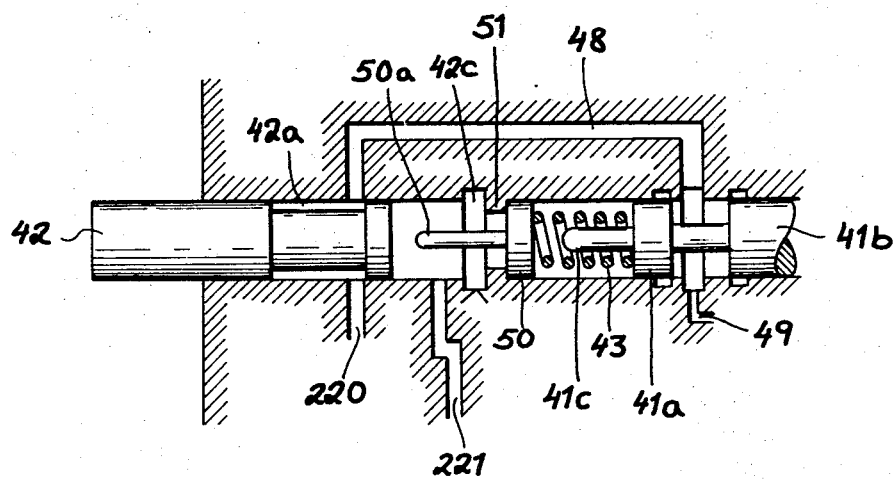
FIG. 5 is a view similar to a portion of FIG. 1, showing a modification.
Figure 6:
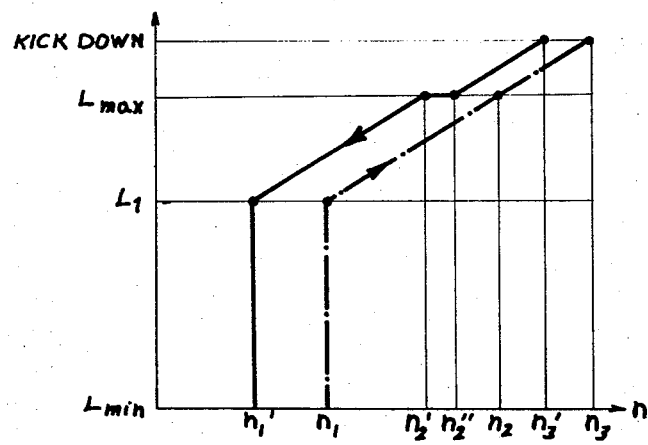
FIG. 6 is a graph similar to FIG. 4 relating to the modification of FIG. 5.

The modified throttle valve shown in FIG. 5 differs from that of FIGS. 1—3 by the fact that the regulated fluid pressure from conduit 48 is directly transmitted to channel 220 by way of the ring space 42a surrounding the plunger 42. For plunger positions corresponding to loads below threshold $L_1$, this fluid pressure is substantially constant inasmuch as the pressure exerted upon head 41a by spring 43 does not vary until the plunger 42 strikes a pin 50a projecting rearwardly from an auxiliary plunger 50 which normally rests against an internal shoulder 51 of the cylinder bore. When the plunger advances to its threshold position, the fluid pressure in channel 220 gradually begins to rise as shown in FIG. 6 so that the switchover speed increases linearly from level $n_1$ through level $n_2$ (full throttle) to level $n_3$ (kick down). In the kick-down range, channel 221 is again unblocked for communication with conduit 48 to reduce the hysteresis as previously described whereby the downshift occurs along the solid line $n_3'$—$n_3''$—$n_2'$—$n_1'$ of FIG. 6.

It will be seen that auxiliary plunger 50 forms, in effect, a lost-motion connection between plunger 42 and spring 43 whereby the spring pressure is made independent of the accelerator position for small loads. Naturally, spring 105 of switching device 90 (FIGS. 1—3) will have to be weaker than in the previous embodiment, for the same threshold $L_1$, in view of the added fluid pressure constantly present in channel 220.

The system described and illustrated may be extended to any number of switching stages, each similar to that shown in FIGS. 1—3, cascaded or connected in tandem as previously explained.

I claim:

1. In an automotive transmission system connected between a fuel-powered engine and an output shaft, including gear-shifting means for switching between a relatively low ratio and a relatively high ratio of output-shaft speed to engine speed and further including operator-controlled accelerator means for varying the fuel supply to said engine, the combination therewith of a source of first fluid pressure varying generally proportionally to said output-shaft speed; fluid-supply means coupled with said accelerator means for generating a second fluid pressure which remains substantially invariable between a retracted accelerator position corresponding to minimum engine load and an intermediate accelerator position corresponding to a predetermined load threshold, said second fluid pressure thereupon rising progressively with further advances of said accelerator beyond said intermediate position; and automatic switchover means for said gear-shifting means comprising a piston having a first face subjected to said first fluid pressure and an opposite second face subjected to said second fluid pressure, said switchover means further including biasing means opposed by said first fluid pressure and aided by said second fluid pressure tending to maintain said piston in a normal position in which said gear-shifting means maintains said relatively low ratio, said first fluid pressure tending to move said piston into an off-normal position in which said gear-shifting means maintains said relatively high ratio whereby upshifting occurs at a substantially invariable output-shaft speed with loads below said threshold and at progressively higher speeds with loads increasing beyond said threshold.

2. The combination defined in claim 1 wherein said fluid-supply means comprises a throttle valve with an inlet for high-pressure fluid and an outlet leading to said switchover means, a valve member shiftable by fluid pressure at said inlet from a relatively open position toward a relatively closed position, adjustable spring means bearing upon said valve member in a sense urging same toward said relatively open position whereby fluid pressure at said outlet varies generally in proportion to the stress of said spring means, and coupling means operatively connecting said spring means with said accelerator means.

3. The combination defined in claim 2 wherein said coupling means comprises a plunger interposed in the fluid path between said outlet and said switchover means for controlling the transmission of said second fluid pressure to said piston in dependence upon the position of said accelerator means.

4. The combination defined in claim 3 wherein said fluid path includes a split conduit with a first branch terminating at said second face of said piston and with a second branch terminating at a third face of said piston turned to the same side whereby the fluid pressures from said branches reinforce each other, said piston in its off-normal position blocking said first branch with a resulting hysteresis effect retarding the return to said normal position.

5. The combination defined in claim 4 wherein said accelerator means has a maximum-load position and a kick-down position beyond said maximum-load position, said fluid path further including an additional conduit controlled by said plunger for communication with said outlet together with said split conduit in said kick-down position, said additional conduit terminating at a location confronting said second face of said piston in the off-normal position thereof for reducing said hysteresis effect.

6. The combination defined in claim 3 wherein said plunger is disposed to block said fluid path in any position of said accelerator means between said retracted position and said intermediate position.

7. The combination defined in claim 6 wherein said piston has an extension with a pair of heads forming two confronting faces of different surface areas positioned to receive pressure fluid in said off-normal position with development of a differential force counteracting said biasing means, thereby giving rise to a hysteresis effect retarding the return to said normal position.

8. The combination defined in claim 7 wherein said accelerator means has a maximum-load position and a kick-down position beyond said maximum-load position, said fluid path including a first conduit with one branch terminating at said second face of said piston and with another branch terminating at a third face of said piston turned to the same side whereby the fluid pressures from said branches reinforce each other, said piston in its off-normal position blocking said one branch with a resulting additional hysteresis effect further retarding the return to said normal position, said fluid path including a second conduit unblocked by said plunger jointly with said first conduit only in said kick-down position and terminating at a location confronting said second face in the off-normal position of said piston for reducing said additional hysteresis effect.

9. The combination defined in claim 3 wherein said coupling means further comprises a lost-motion connection between said plunger and said spring means.